United States Patent [19]

Noyama et al.

[11] Patent Number: 5,594,850
[45] Date of Patent: Jan. 14, 1997

[54] IMAGE SIMULATION METHOD

[75] Inventors: Hideo Noyama; Makoto Kato, both of Yokohama; Makoto Nohmi, Katsuta; Yuri Takizawa, Yokohama, all of Japan

[73] Assignee: Hitachi, Ltd., Tokyo, Japan

[21] Appl. No.: 186,312

[22] Filed: Jan. 25, 1994

[30] Foreign Application Priority Data

Jan. 29, 1993 [JP] Japan .................................. 5-034721

[51] Int. Cl.$^6$ .................................................. G06F 15/00
[52] U.S. Cl. .................................................. 395/135
[58] Field of Search .................................. 395/133, 135, 395/155, 161; 345/113, 114

[56] References Cited

U.S. PATENT DOCUMENTS

| | | | |
|---|---|---|---|
| 4,685,070 | 8/1987 | Flinchbaugh al. | 364/522 |
| 5,247,610 | 9/1993 | Oshima et al. | 395/135 |
| 5,265,214 | 11/1993 | Nitta | 395/122 |
| 5,289,568 | 2/1994 | Hosoya et al. | 395/135 |
| 5,299,301 | 3/1994 | Nohmi et al. | 395/131 |
| 5,313,227 | 5/1994 | Aoki et al. | 345/118 |
| 5,317,678 | 5/1994 | Okawara et al. | 395/126 |
| 5,377,314 | 12/1994 | Bates et al. | 395/135 |
| 5,379,371 | 1/1995 | Usami et al. | 395/128 |

FOREIGN PATENT DOCUMENTS

| | | |
|---|---|---|
| 2-330712 | 11/1990 | Japan . |
| 3-132595 | 6/1991 | Japan . |
| 3-279263 | 8/1992 | Japan . |

OTHER PUBLICATIONS

Pixel, No. 84, pp. 181–184, 1994.

*Primary Examiner*—Phu K. Nguyen
*Attorney, Agent, or Firm*—Fay, Sharpe, Beall, Fagan, Minnich & McKee

[57] ABSTRACT

Simultaneously and automatically with creating a CG image by computer graphics, (1) the image is segmented to create a mask image, (2) a mask attribute table is created by data transformation, (3) an intrinsic image (object color component, light source color component, ambient color component) is created by data transformation, and the results are saved. The mask image is used to cut a portion from the computer graphics image and the cut portion is combined with a different image, which may be a natural image for example, to obtain a composite image, and at the same time, transparency processing or other such image processing is conducted on the basis of the attribute data. In addition, the color etc. of the object are modified by changing the object color vector or the like.

27 Claims, 10 Drawing Sheets

IMAGE SIMULATION METHOD

BACKGROUND OF THE PRESENT INVENTION

This invention relates to image simulation for use in digital image transactions, more specifically creating and color transforming a composite image combining a computer graphics image, a natural image and written characters.

Printers, television stations, etc. do not always use images just as they are taken with a camera. They also use patch printing, chromakey synthesis and the like to produce new images by inserting one image into another. Image synthesis and color change are also conducted in image simulation for processing digital images.

This has been achieved by the following procedures:

(1) Image gathering

The source image to be pasted and the background image are obtained. If a person wishes to create an image of a house with a car parked in front, a snapshot of the car is taken as the source image and a picture of the house is taken as the background photograph.

(2) Segmentation

The region of the source image to be pasted is cut out (this region is called the "mask"). In our example this would be the region of the source image occupied by the car. Methods for creating masks are discussed in PIXEL, No. 84, pp. 181–184, under the heading of Introduction to Digital Painting for Graphic Designers.

(3) Attributes

The mask is assigned attribute information required for calculations and processing. This work is directly related to the segmentation and is conducted by a human operator defining the attribute information. A color picture is nothing more than orderly arranged color pixels. The observer of an image is able to recognize the depicted object or to imagine the object shape only because he or she has knowledge related to the shape of the object or knows how to view the object in terms of the directions of the light source and the planes. Therefore, when provided with only a natural image, the person has this knowledge.

The aforementioned prearranged processes (1)–(3) for image simulation have been manually conducted with respect to a digital image created from the natural image taken with a camera, scanner, or the like. When image assembly is conducted in image simulation, an image region is cut out as a mask, and assembly transactions, i.e. color calculations, are conducted between the cut-out region (mask) and another image (background image) in accordance with the attributes.

Images created using computer graphics (CG images) are also used to create composite images by combination with natural images. When a CG image is used in image simulation, the same prearranged processes are again required between the CG image and the natural image. This is because the purpose of computer graphics is to create CG images and the CG image normally does not become a color image until after CG color image formation.

CG image segmentation can be classified in two categories as regards complexity. The first category includes a CG image of an object, such as a car, that normally has no background, making it easy to cut out the car object region. The second category includes a CG image of a scene where a number of objects coexist, making the cutting out of a single object about as difficult as in the case of a natural image.

Color change simulation is described in Japanese Patent Hei 3-132595 corresponding to U.S. Ser. No. 07/892,962, filed Jun. 3, 1992 for "Method for Changing Color Images".

For simulation as described in Japanese Patent Application Hei 3-279263, corresponding to U.S. Ser. No. 07/964,293 the region to be changed is segmented from the region not to be changed with a mask, a rectangle is defined in the original image to be pasted, and, for enabling the rectangle to be modified and pasted in a quadrangle, four corresponding apexes are designated in the base image.

Define the coordinates (in a simultaneous coordinate system) of the four points in the image to be pasted as $(x_{si}, y_{si}, 1)$ and the coordinates of the corresponding points in the base image as $(x_{di}, y_{di}, 1)$, where $i=1$–$4$. Define the transformation matrix for moving $(x_{si}, y_{si}, 1)$ to $(x_{di}, y_{di}, 1)$ as A. This relationship is represented by Eq. 1.

$$(x_{di}, y_{di}, 1) = (x_{si}, y_{si}, 1) \cdot A \quad \text{(Eq. 1)}$$

$$A = \begin{pmatrix} a_{11} & a_{21} & c \\ a_{12} & a_{22} & d \\ b_1 & b_2 & 1 \end{pmatrix}$$

Thus, $x_{si}$ and $y_{si}$ can be used to represent $(x_{di}, y_{di}, 1)$ as in Eq. 2.

$$(x_{di}, y_{di}, 1) = (a_{11} \cdot x_{si} + a_{12} \cdot y_{si} + b_1, \quad \text{(Eq. 2)}$$
$$a_{21} \cdot x_{si} + a_{22} \cdot y_{si} + b_2,$$
$$c \cdot x_{si} + d \cdot y_{si} + 1)$$

When Eq. 2 is converted to ordinary coordinates, $x_{di}$, $y_{di}$ can be represented as in Eq. 3.

$$x_{di} = a_{11} x_{si} + a_{12} y_{si} + b_1$$
$$y_{di} = a_{21} x_{si} + a_{22} y_{si} + b_2 \quad \text{(Eq. 3)}$$

Writing Eq. 3 as a matrix gives Eq. 4.

$$(x_{d1}, x_{d2}, x_{d3}, x_{d4}, y_{d1}, y_{d2}, y_{d3}, y_{d4}) = (a_{11}, a_{12}, b_1, a_{21}, a_{22}, b_2, c, d) \cdot T_1 \quad \text{(Eq. 4)}$$

-continued $$T_1 = \begin{vmatrix} x_{s1} & x_{s2} & x_{s3} & x_{s4} & 0 & 0 & 0 & 0 \\ y_{s1} & y_{s2} & y_{s3} & y_{s4} & 0 & 0 & 0 & 0 \\ 1 & 1 & 1 & 1 & 0 & 0 & 0 & 0 \\ 0 & 0 & 0 & 0 & x_{s1} & x_{s2} & x_{s3} & x_{s4} \\ 0 & 0 & 0 & 0 & y_{s1} & y_{s2} & y_{s3} & y_{s4} \\ 0 & 0 & 0 & 0 & 1 & 1 & 1 & 1 \\ -x_{s1} \cdot x_{d1} & -x_{s2} \cdot x_{d2} & -x_{s3} \cdot x_{d3} & -x_{s4} \cdot x_{d4} & -x_{s1} \cdot y_{d1} & -x_{s2} \cdot y_{d2} & -x_{s3} \cdot y_{d3} & -x_{s4} \cdot y_{d4} \\ -y_{s1} \cdot x_{d1} & -y_{s2} \cdot x_{d2} & -y_{s3} \cdot x_{d3} & -y_{s4} \cdot x_{d4} & -y_{s1} \cdot y_{d1} & -y_{s2} \cdot y_{d2} & -y_{s3} \cdot y_{d3} & -y_{s4} \cdot y_{d4} \end{vmatrix}$$

If the inverse matrix $T_2$ of $T_1$ in Eq. 4 can be obtained, Eq. 5 can be used to obtain a coefficient of matrix A.

$$(a_{11}, a_{12}, b_1, a_{21}, a_{22}, b_2, c, d) = (x_{d1}, x_{d2}, x_{d3}, x_{d4}, y_{d1}, y_{d2}, y_{d3}, y_{d4}) \cdot T_2 \quad \text{(Eq. 5)}$$

One method commonly used for obtaining matrices is the Gauss-Jacobi method. Obtaining the transformation matrix A by this method makes texture mapping of the appointed region possible.

SUMMARY OF THE INVENTION

The present invention includes analysis of the prior art, its problem and causes of such problems, in addition to solutions to such problems.

With respect to an object in a CG image or a composite image of a CG image and a natural image; it is important to segment the region to be changed with a mask and then to create an intrinsic image of the region interior.

Colors are usually each directly expressed using proportions of red (R), green (G) and blue (B) density. An intrinsic image is constituted by separating the colors into components, namely light source colors (direct illumination light), object colors (corresponding to the paint colors) and ambient colors (light reflection from surrounding objects), and assigning a ratio of each component with respect to its maximum value.

Color scales and how to make a composite image are discussed in "Image Synthesizing Method and Character Font Generating Method", U.S. Ser. No. 07/796,313, filed Nov. 22, 1991.

An intrinsic image is generally created by:

(1) Determining the direction vector for each component, because the intermingling of the components makes it difficult to separate the color into its individual components. Therefore, the pixels are plotted in RGB space and their distribution examined.

(2) If the ambient color is assumed constant, then each pixel color is represented by the vector sum of the object color and the light source color, and the plotted points are distributed in the plane including the two vectors. An operator observes the pixel distribution and creates the minimum parallelogram enclosing all of the plotted points.

(3) Since two sides of the parallelogram correspond to the vectors of the object color component and the light source color component, the intrinsic values can be obtained by projecting the color of each pixel on each vector and calculating the maximum value of each component.

As explained in the foregoing, for a CG image in image simulation, a human operator has had to conduct prearranged processing with respect to the images to be used, specifically, carry out segmentation with a mask and prepare the intrinsic image. Moreover, for conducting color change in image simulation, the object color or the light source color has been changed by changing the object color vector or the light source color vector used as a reference at the time of intrinsic image creation so as to reconstruct the object color components or the light source color components.

For changing the orientation of an object in a CG image (two dimensional, 2D) a new CG image is created by moving the shape model (three dimensional, 3D) of the object with computer graphics.

Use of written characters or a pattern design in a natural image or a CG image is accomplished by changing the color or line width of the characters, or changing the shape of the characters, by working through outline data or a bit map image to carry out geometrical transformation, or specifying the painting color.

The aforesaid prior art involves the following problems.

It is fundamental to the creation of an image by computer graphics that information be given regarding a 3-D shape model, that a CG image is obtained by projection of the shape model on a plane, that hidden lines and hidden surfaces be processing, and that the type of light source, shading and the like be defined. However the conventional CG image created for visualization cannot be used immediately, but has to be segmented and subjected to other prearranged processes by a human operator.

Some specific objects of the invention are:

(1) to create a composite image from a CG image and a natural image;

(2) to enable a CG image or a composite image created from a CG image and a natural image to be immediately used in image simulation, and wherein the color of an appointed image area can be changed;

(3) to texture map an appointed image area;

(4) to change the orientation of an object created by computer graphics and contained in a CG image or a composite image created from a CG image and a natural image; and (5) to use mask calculation with respect to written characters and pattern designs, without need for conducting geometrical transformation together with pasting.

Simultaneously with the processing for creating a CG image by computer graphics, the objects are achieved by (1) automatically segmenting the CG image to create a mask image for projecting regions of an object painted a color on the CG image and writing mask values in these regions, (2) defining a mask attribute table by data transformation, for interrelating the mask values and attribute information of the object. This mask is used to cut out only a desired image region from a computer graphics image to be combined with another image, for example, a natural image of a scene; (3) transparency processing on the basis of the attribute information; (4) creating an intrinsic image by data transformation, by calculating color components from, the light source color, object color vector, image angles, the light source color vector, the light source color attenuation factor, the dispersion reflectivity and the specular reflectivity as simulation data; (5) changing the object color vector and light source color vector; etc.

Mask images consist of subdivided region masks of regions each having the same surface normal or same surface transparency. The mask attribute table describes the direction of the surface normals. Texture mapping of the image to the object surface is conducted by geometric transformation.

The surface normals are used when the orientation of the object in the CG image is changed by geometric transformation and to obtain angles used in color calculation.

A mask image from written character or pattern design outline data is bit map data processed for mask addition and subtraction. A table interrelating mask ID numbers and properties of the written character or pattern design is created. Part or all of the character or pattern are cut out of the character or pattern image and combined with another image, which may be a natural scene image or a CG image.

Since the above processing is automatically conducted when a CG image is created: the need for any prearranged process by a human operator is eliminated, and therefore image assembly simulation using CG images can be conducted immediately and simply; there is no need for a human operator to analyze the pixel colors and as a result, color change simulation of the CG image can be conducted immediately and simply; and geometric transformation considers the connective relationship among the surfaces so that it is possible to achieve some degree of change in object orientation without using computer graphics.

BRIEF DESCRIPTION OF THE DRAWINGS

Further objects, features and advantages of the present invention will become more clear from the following detailed description of a preferred embodiment, shown in the accompanying drawings, wherein.

DETAILED DESCRIPTION OF A PREFERRED EMBODIMENT

In the present invention there is a distinction between: data gathering in the formation of the computer graphics image; the automatic formation of the transformation data; and simulation, which is the actual cut and paste or color changing.

Figure 1:
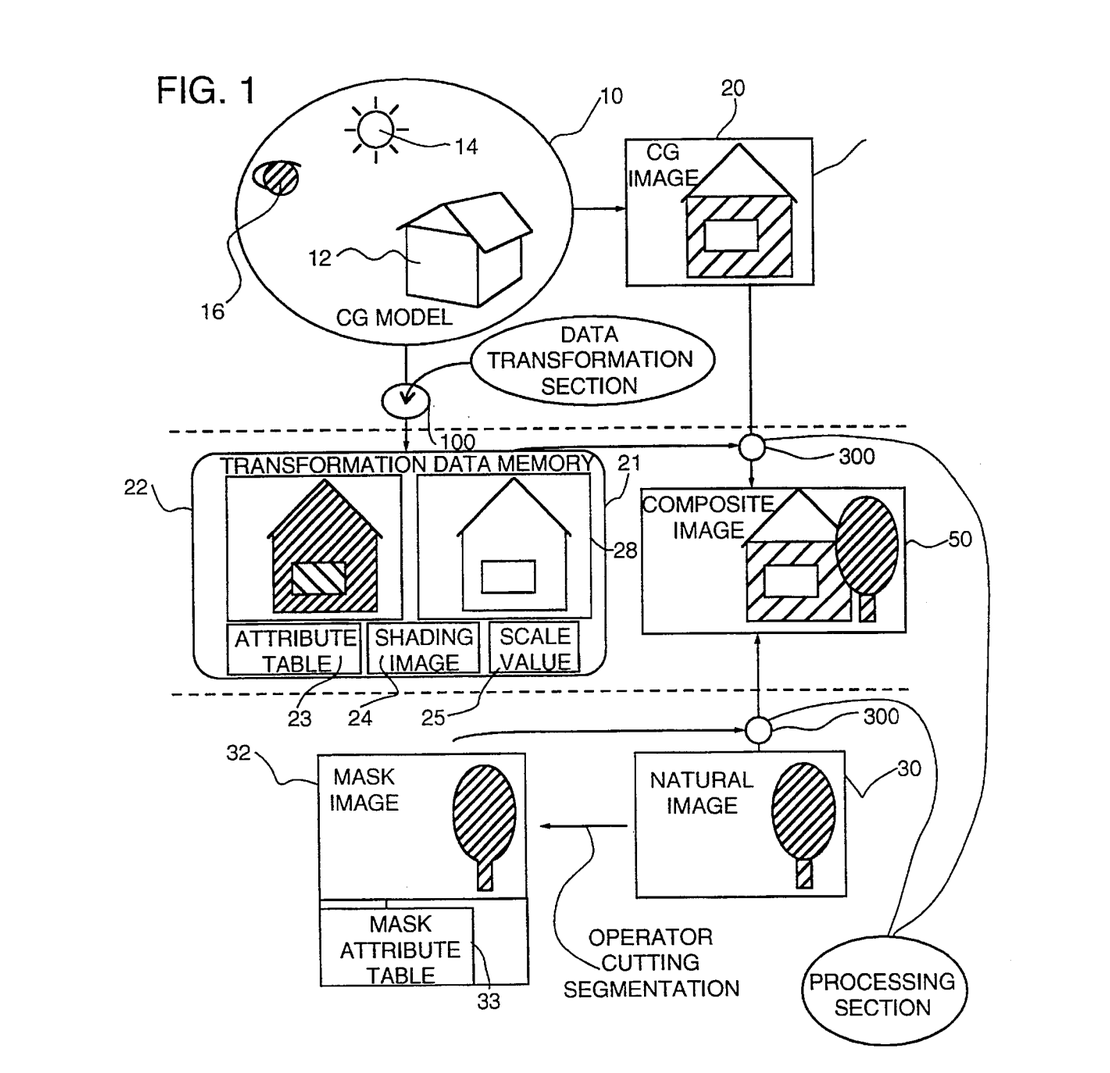
FIG. 1 is an image simulation system for combining a CG image with a natural image.

In FIG. 1, a CG model 10 consists of an object shape model 12 made up of object shape and object surface attributes, a light source model 14 including the light source position and light properties, and an eye position 16. In ordinary computer graphics, the aim is to create a CG image 20 projected on a two dimensional plane, which will not be described since it is well known. In this invention, however, in addition to data gathering by creating the CG image 20 as in the prior art, transformation data (for potential image simulating in image simulation section 300 involving cut and paste, and color changing) is automatically generated during the creating by a data transformation section 100 and automatically stored in a transformation data memory 21 by data transforming. The transformation data is a mask image 22, a mask attribute table 23, a shading image 24, a scale value 25, an intrinsic image 28 and the like.

Figure 3:
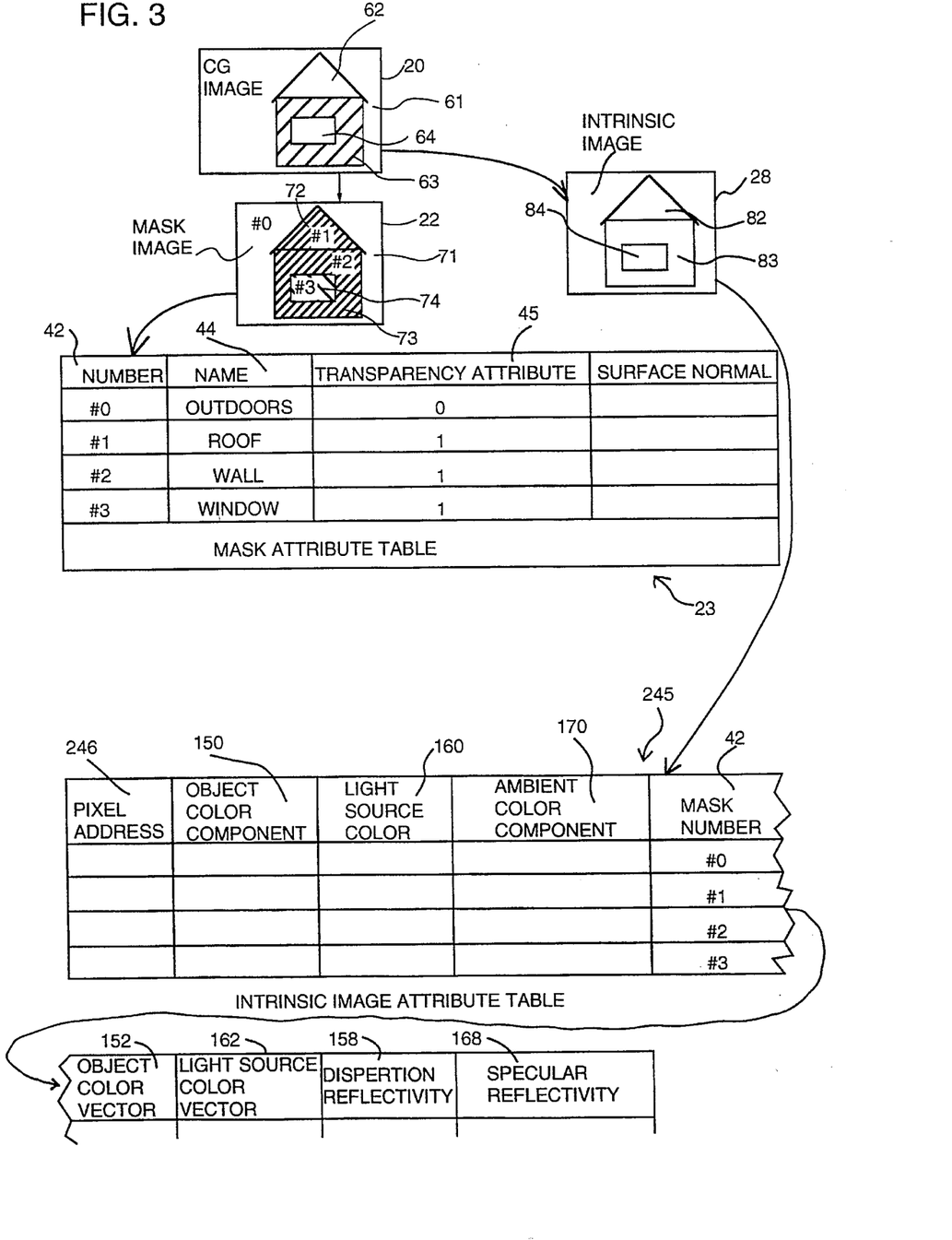
FIG. 3 shows the basic data created by data transformation according to FIG. 2 and stored in a memory.

FIG. 3 is a detailed explanatory view of the transformation data 22, 23, 24, 25 and 28 that is automatically generated during the creating of the CG image 20 and automatically stored in the memory 21. The transformation data constitutes the basic data group required for enabling the CG image to be pasted in a natural image by simulation. As shown in the example, the CG color image 20 represents a house comprising a roof 62, a wall 63 and a window 64 surrounded by the outdoors 61. The mask image 22 is segmented into a roof region 72, a wall region 73, a window region 74 and an outdoor region 71. The outdoor region 71 is assigned 0, the roof region portion 72 is assigned 1, the wall region 73 is assigned 2, and the window region 74 is assigned 3, as mask ID numbers. Each region, 0–3, is a separate mask. Each mask or region is determined as a single continuous region of the CG image that has a single value for a particular attribute, which in the example is either or both of transparency and surface normal.

The mask attribute table 23 links together information such as the mask ID number 42, the names 44 assigned to the mask regions, and transparency and surface normal attributes 45. The transparency example here indicates opaque (1) or transparent (0). The surface normals are described further relative to FIG. 10. The other attributes (not shown) in the table vary widely depending on the type of segmentation.

The intrinsic image 28 consists only of the pixel values needed for the regions to be color transformed, for example in a bit map. The values are calculated separately for a roof region 82, a wall region 83 and a window region 84. This intrinsic image 28 does not consist of pixels described in terms of the mixing ratio of the three primary colors as in the generally used system, but of pixels each consisting of a group of intrinsic values which define the object color component 150 (the color of the object itself), the light source color component 160 resulting from reflection of light source light and the ambient color component of the ambient light, shown in greater detail in FIG. 12 where the procedure for automatically calculating these values is explained.

Figure 4:
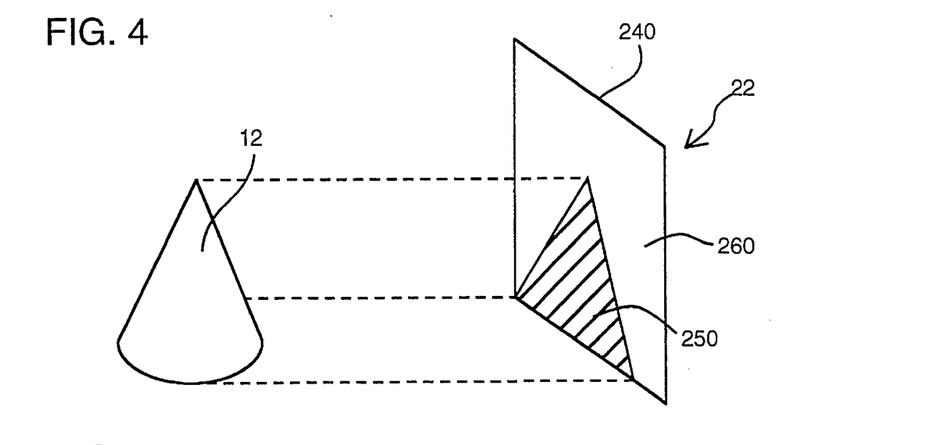
FIG. 4 shows creating a mask image from a CG shape model.
Figure 12:
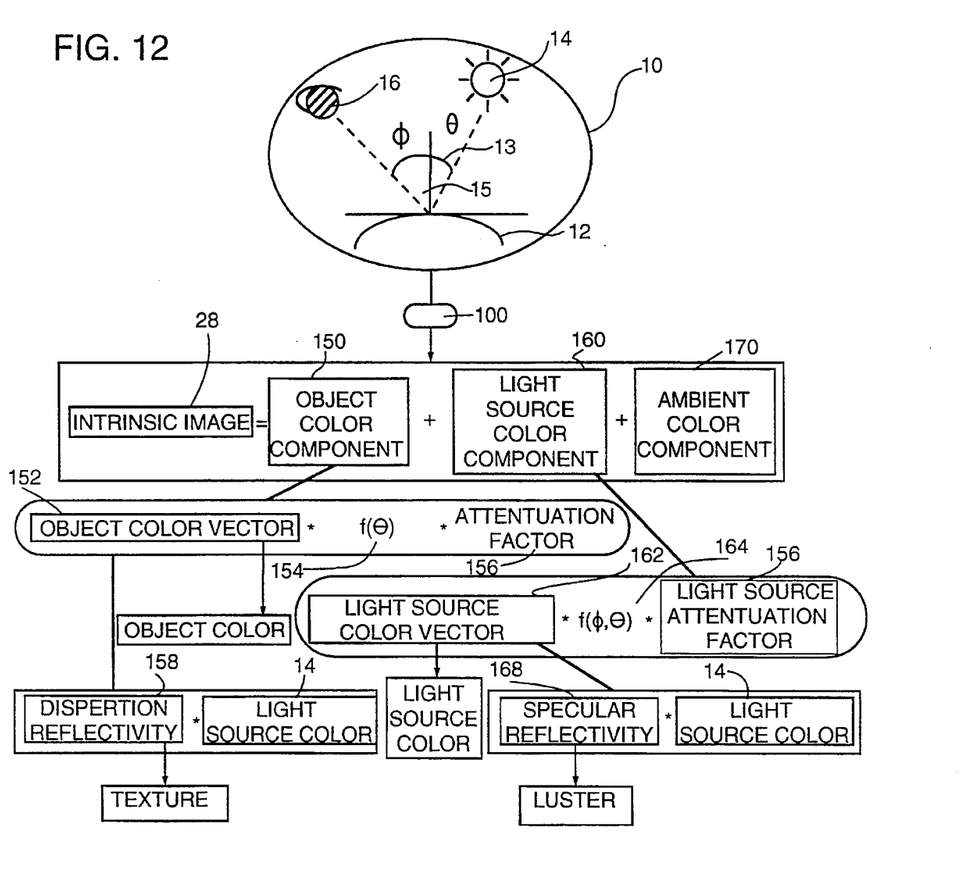
FIG. 12 is a diagram for explaining data transformation for obtaining color attributes and for changing color of a CG image.

The procedures for creating the mask image 22 from the shape model 12 by computer graphics will now be explained with reference to FIG. 4, where dotted lines are sight lines from the eye 16 as shown in FIG. 12. The computer graphics shape model 12, which is three-dimensional, is projected onto a projection plane. For example, parallel projection method can be employed. As a result, a two dimensional CG image is created corresponding to a shadow of the shape model 12 on the plane 240. The pixels included in the region 250 (a region having the same value of an attribute/s, for example transparency will constitute a mask) are assigned a different mask ID number from the mask ID number assigned the pixels in the exterior region 260, whereby there is obtained a mask image 22, of masks 250 and 260. The projection plane 240 and the projection method of FIG. 4 can be the same as those used in the conventional computer graphics to obtain a CG image from a shape model. When a region in the CG image has been properly cut out by the automatic segmentation, the mask image 22 has been created.

One should distinguish between the computer graphics image and the mask image. The mask image does not have the details of the computer graphics image relating to color or pixel intensity but is merely divided or segmented regions with the regions being masks respectively identified with mask ID numbers so that the masks may be used later in producing the composite image by the simulation.

An example of automatically generating the transformation data 22, 23, 24, 25, 28 at the time of creating the CG image 20 will be explained with reference to the flow chart of FIG. 2.

In computer graphics, CG images 10 are generally created by tracing the rays from the light source 14 to determine the colors on the screen. Creating the CG image 10 is data gathering and in the present invention this is conventionally accomplished, by e.g. a CAD program.

In the data transformation of the present invention where only a single image region out of the CG image 10 created by the data gathering may need to be known, however, it is more efficient to reverse the tracing direction and trace the rays starting from the eye 16. Therefore, at "Start" (100) in FIG. 2, starting with the pixel at the extreme upper left of the region being processed of the image (102), the locus traveled by the light ray is traced from the eye 16 until the color of the pixel is determined (104–130). When it is determined there are unprocessed pixels (132–NO), the next pixel is moved to (102). When every pixel of the image has been examined (132–YES), the data transformation comes to an "End" (136). The processing of FIG. 2 is repeated only for a region out of the whole CG image when such region has been altered in creating the CG image.

The ray tracing starts from the eye 16 and continues along a straight line connecting the eye 16 and the pixel being processed on the projection plane until striking an object, e.g. a shape object 12 (104), then a check is made as to whether or not the object struck is the light source 14 (106). If the object is not the light source 14, the object is identified (108) and, based on the identification, the mask ID number 42 written to the corresponding pixel address 246 in the intrinsic image attribute table 245, FIG. 3, of the mask image (109), the object color component 160 and attribute 45 of the object are determined (110), and the data saved in the attribute tables 23 and 245 (111). Then, returning to step 104, the tracing of the same light ray locus is continued.

If the object struck (the continuing path of the ray is determined by the transparency attribute 45) is the light source 14 or the ambient light, the light source color component 160 or ambient color component 170 is determined (112) (see also FIG. 12). In this case, the object color vector 152, [which is the product of the light source color 160 (color of light source 14) and the dispersion reflectivity 158 as determined by the attribute data 45 recorded in step 111] is calculated (114), and the object color component 150 is obtained as the product of the object color vector 152, an attenuation factor 156 and a function of θ (the angle between the light source 14 and the normal 15 to the surface of the object 12) (116).

The light source color vector 162, which is the product of the light source color 14 and the object specular reflectivity 168 (as shown in FIG. 12), is calculated (118). The light source color component 160 is calculated as the product of a function (a function of the angle φ formed between the eye 16 and the object surface normal 15, and the angle θ between the light source 14 and the normal 15 to the surface of the object 12), the light source attenuation factor 156 and light source color vector 162 (120). Since the light source color 248 was determined from step 112 and the ambient light color 170 is determined in step 122 upon completion of the ray tracing, the pixel color (intrinsic image 28 is a bit map of the color for all pixels) can be calculated as a product of ambient color 170, light source color component 160 and object color component 150 (124). The determined pixel color is written to the intrinsic image 28 (126).

Next the ratios of the respective color components 150, 160, 170 to the respective color vectors 152, 162 are calculated as intrinsic values (128) and then saved to the intrinsic image 28 (130).

In FIG. 12 all the calculations are known and described in the above-mentioned application U.S. Ser. No. 892,962 and that application merely saves the ultimate intrinsic value for each pixel to make up the intrinsic image 28. A new part in the present invention is that the present application saves values of color components 150, 160 and 170 as separate values for each pixel, which values can be used later in simulation (cut and paste) or in changing color. Further the present invention saves separately values of data 152, 162, 158 and 168 for each pixel to be used later in simulation. The dispersion reflectivity 158 is a relationship of amplitude to spectrum frequency (preferably in the form of a look-up table) which multiplied by the relationship of amplitude to spectrum frequency (know characteristics of the light source) of the light source will produce the object color vector 152 and the output is color texture, which would indicate bumpiness and various contours of the surface and the like when viewed as a whole.

All the calculations in FIG. 12 are per pixel (i.e. intrinsic), that is they are accomplished for each pixel and the values mentioned above as saved are saved for each pixel, to collectively form the intrinsic image 28 (the intrinsic image 28 is in this respect quite different from a natural image 30 where each pixel is only defined as a color).

Figure 2:
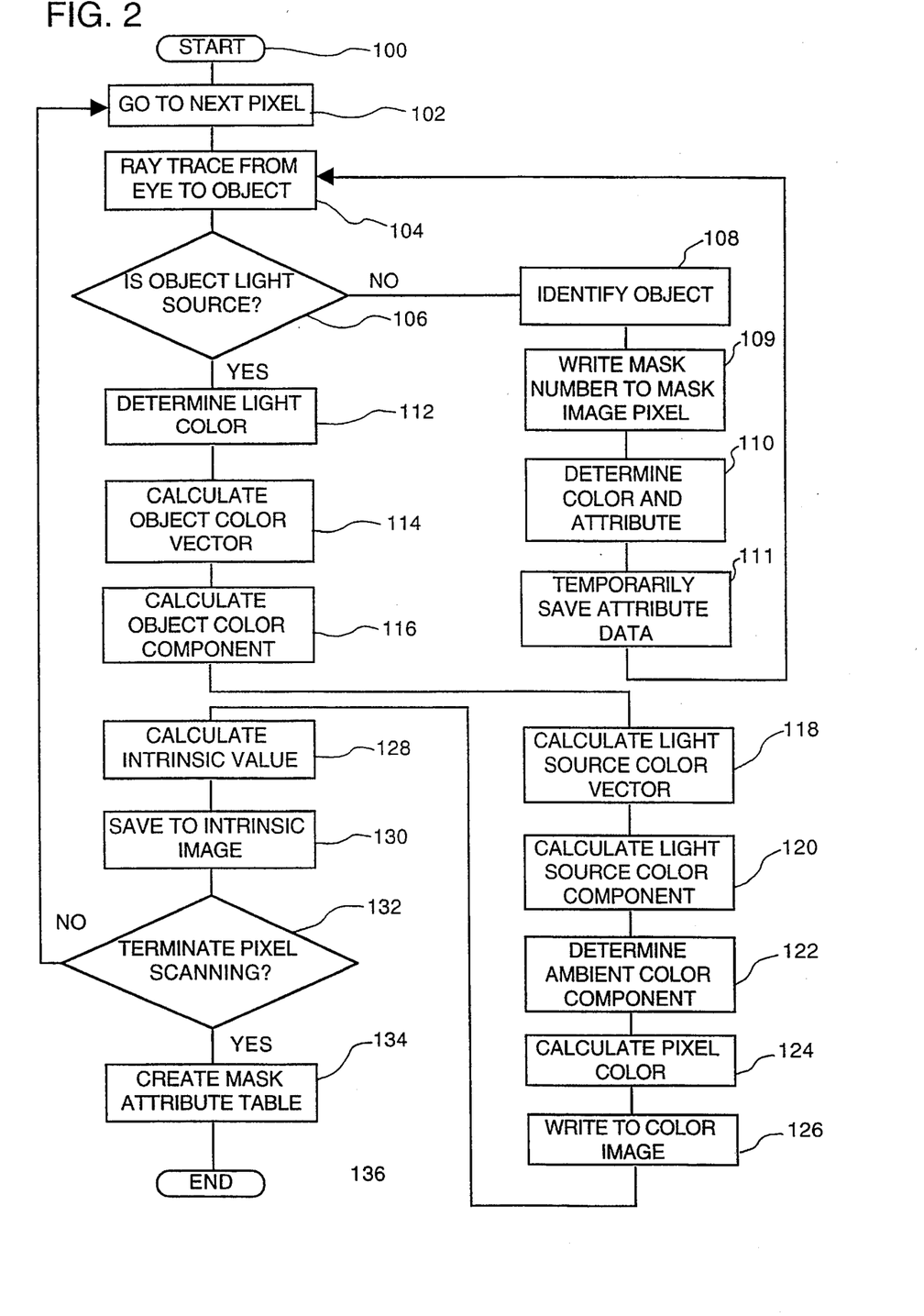
FIG. 2 is a flow chart for automatically transforming data in section 100 of FIG. 1 for image simulation at the time of creating a CG image.

After the mask image 22 and the intrinsic image 28 have been automatically generated in accordance with the generating of transformation data in FIG. 2, the mask attribute table is automatically created involving the mask type (134).

In the prior art, when a natural image is combined with a computer graphics image, the pixels of the natural image portion of the composite image only have a single color value assigned to them which will remain the same in the composite image. In the present invention, the natural image region has its color pixel values substituted as an appropriate value for one of the variables shown in FIG. 12 so that the object cut from the natural image will change when combined into the composite image depending upon the other variables of FIG. 12. For example, the pixel colors of the natural image region may determine values of data 158, or 152, or 160 automatically, so that each pixel of the composite image that is in a region common to the natural and CG images will have its data 160, 170, 154, 156, 14 taken from the CG image.

The aforesaid data transformation generating of FIG. 2, creates the mask image 22, the mask attribute table 23 and the intrinsic image 28 (including the intrinsic image table), which occurs automatically during CG image 20 creation (including change or editing).

The natural image 30 in FIG. 1 consists solely of color information for each pixel and, a human operator carries out prearranged processing for cutting out the object (here a tree 66 in FIG. 6) from the natural image 30 (consisting of the tree and background), creating a mask image 32 (tree, no background) from the natural image 30, and manually fills in a mask attribute table 33. With respect to a CG image 20 created with computer graphics (data gathering) and the simultaneous automatic generating of transformation data (data transforming) for later image simulation (simulating), which transformation data is compatible with the pixel color data in the natural image 30, it is possible to immediately create a composite image 50 by combining the CG image 20 (or more accurately the transformation data) and the natural image 30 (or more accurately the mask image 32 of the natural image 30) in the simulation section 300. In addition to such combination, the intrinsic image 28 can be utilized for conducting color change as another type of image simulation.

Figure 5:
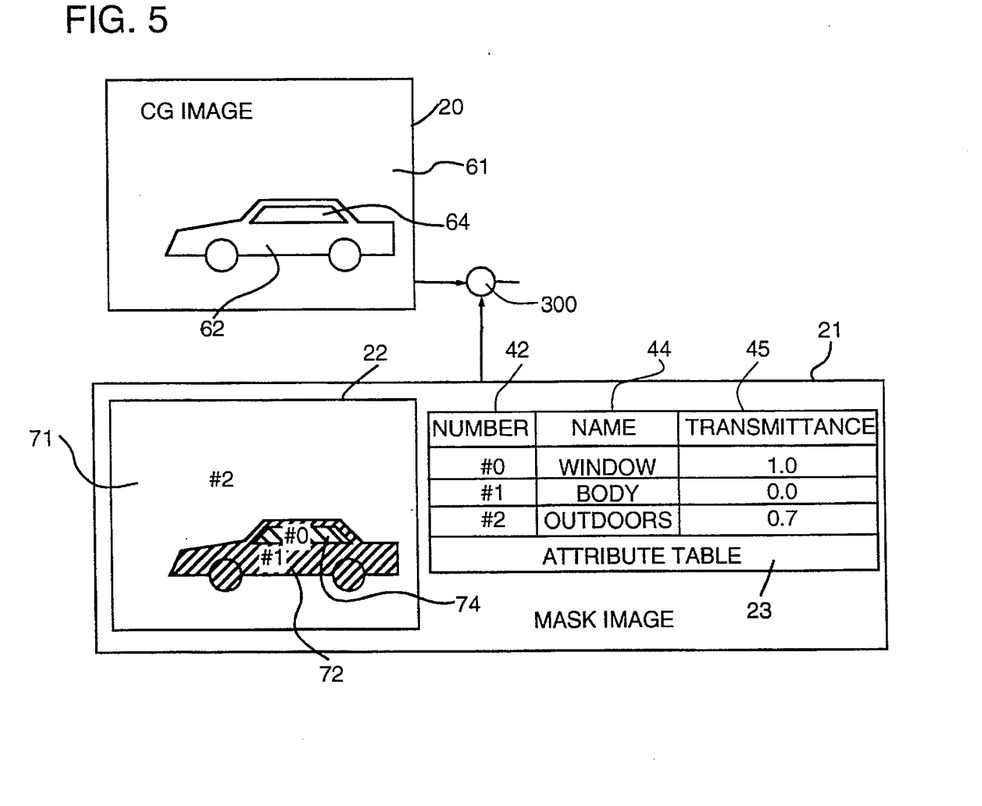
FIG. 5 shows an example of data created by data transformation and stored in memory for conducting semitransparent processing.

In the foregoing, the object 12 found by ray tracing is identified in step 108. If, for example, the identified object includes semitransparent glass (the glass of the car window 64 in FIG. 5), then, as shown in FIG. 5, the color CG image 20 is segmented into a transparent outdoors region 61 (mask), an opaque car body region 62 (another mask) and the semitransparent car window region 64 (a third mask). The corresponding mask regions 71, 72 and 74 of the mask image 22 are assigned mask identification numbers 45, e.g. 0, 1 and 2, respectively. Further, in step 11 the transmittance 45 is written into the mask attribute table 23 as an attribute corresponding to the mask number 42.

Figure 6:
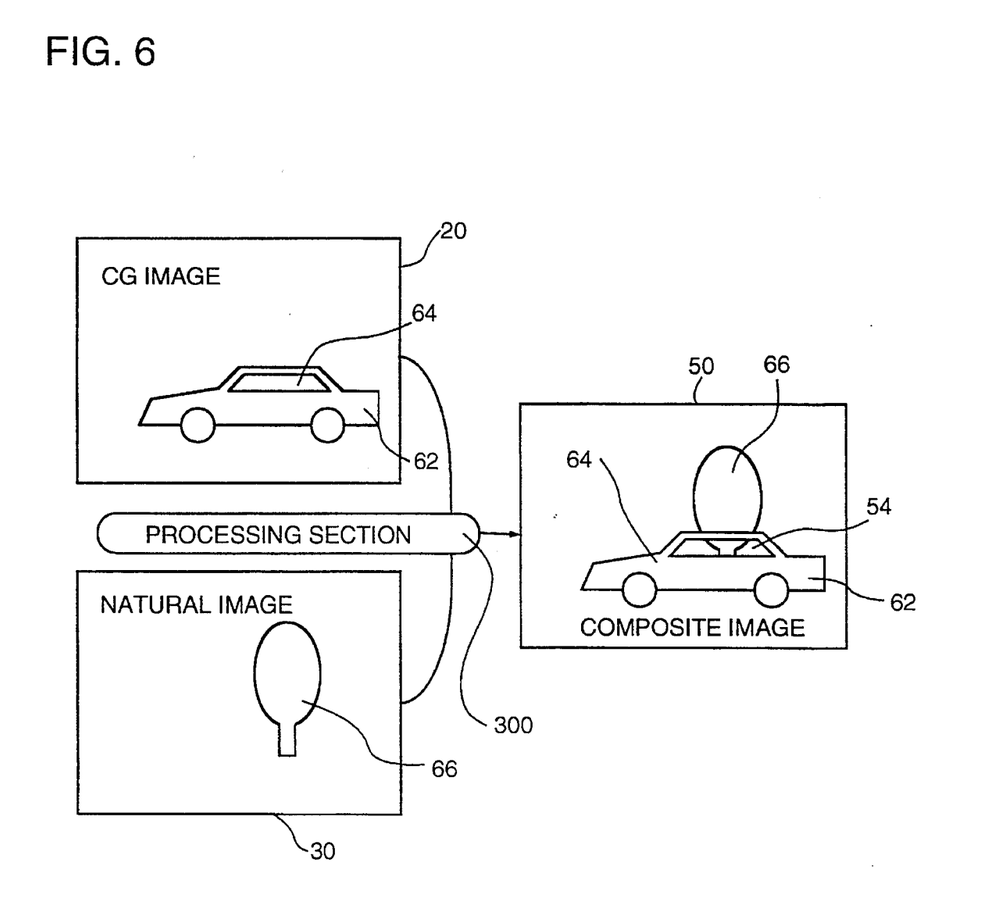
FIG. 6 is an explanatory view showing the effect of enabling an object to be seen through glass in image simulation using the data of FIG. 5.

As shown in FIG. 6, when this method is used in the image assembly simulation for combining the CG image 20 and the natural image 30 in the simulation section 300 of the computer system, object 66 is placed behind the car window 64, and a composite image 50 is displayed on an output device to include a region 54 processed so as to make the object 66 behind the car visible through the glass of the window 64. This method enables window glass, shading etc. to be expressed naturally.

Figure 7:
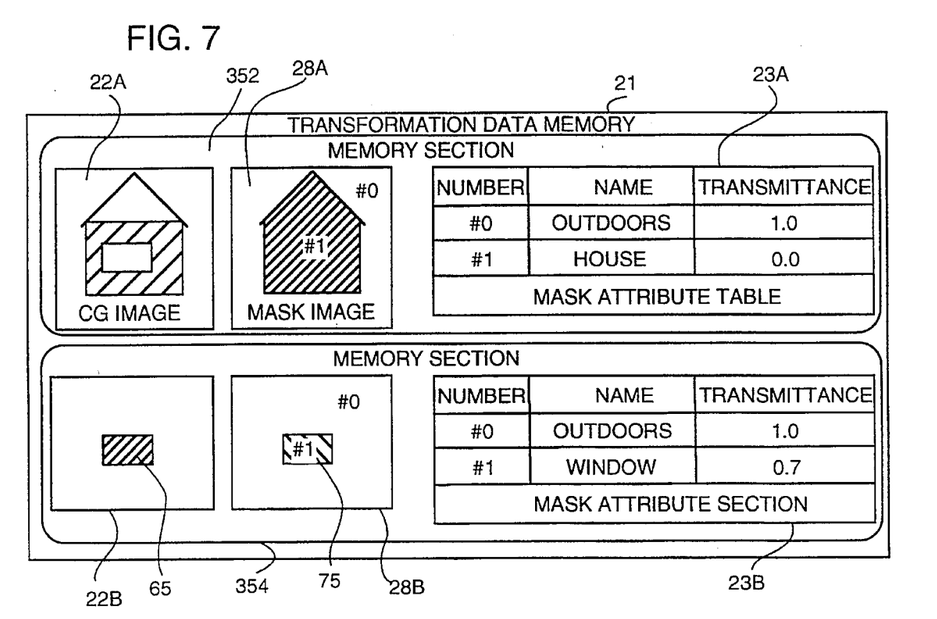
FIG. 7 shows an example of data created by data transformation and stored in memory for conducting semitransparent processing for placing an object behind a window pane in image simulation for creating composite images.
Figure 8:
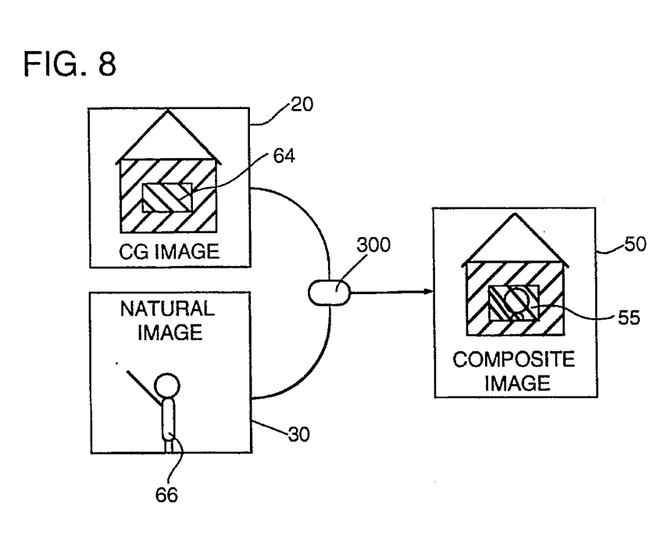
FIG. 8 is an explanatory view showing the effect of enabling an object to be placed between a window pane and a room interior in image simulation using the data of FIG. 7.

In the transformation data generating of FIG. 2, ray tracing is conducted beginning from the eye 16 and the transformation data of the first object reached is written in memory 21 to include the mask and intrinsic images. However, in a case shown in FIG. 8 where the inside of a room is visible through the window 64 in a color CG image 20, transformation data of only the surface of the glass of window 64 does not enable another object 66 to be placed inside the room realistically. Therefore, for enabling this kind of image simulation the data transformation section 100 of FIG. 1, processes transformation data for two regions which is stored in two memory sections 352 and 354 of memory 21, as shown in FIG. 7. A color intrinsic image 28A, mask image 22A and mask attribute table 23A prepared on the assumption of no window glass (the interior far wall seen through the window is a part of this data) are saved in the memory section 352, and a color intrinsic image 28B, a mask image 22B and a mask attribute table 23B for only the window portion are saved in the memory section 354. Further, the simulation section 300 creates a temporary composite image using the transformation data in the memory section 352 combined by being placed behind the mask of the object 66 cut from a natural image. Then the simulation section 300 creates a final composite image by combining the transformation data for only the window (not the inside wall) of the memory section 354, on top of the temporary composite image. The final composite image 50 displays a region 55 including the object 66 in front of the interior wall and in the room behind the glass of the window 64.

Figure 9:
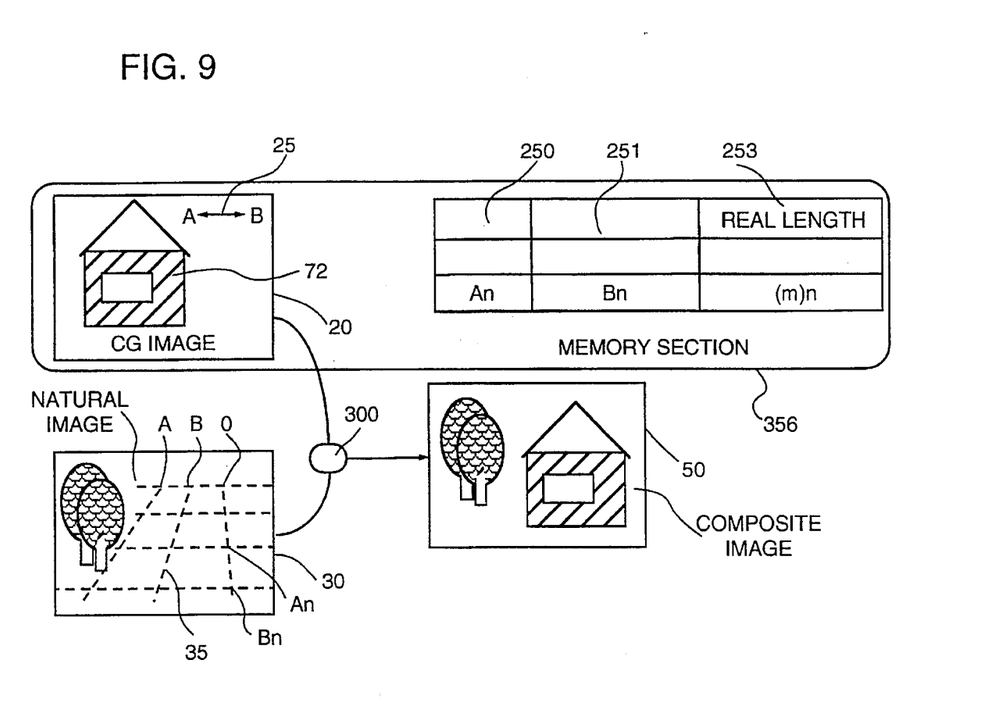
FIG. 9 is an explanatory view showing how saving the size of an object appearing in an image enables the size to be automatically determined at the time of image assembly by scaling.

For recording a scale 25 (FIG. 1) indicating the real dimensions of the CG image 20 in a memory section 356 of the transformation data memory 21, as shown in FIG. 9, a table 49 records an indicator of actual length as coordinates 250, 251 respectively of two points A, B on the CG image 20 and the actual distance 253 between the two points A, B. Preferably a perspective grid 35 is associated with the CG image 20 and the above indicator is saved individually for each line of the grid between two intersection points.

Thus the actual image length of any distance between two points on the CG image 20 can be determined. Then if a natural image 30 containing data of grid 35 enabling calculation of actual lengths from positions in the natural image 30 is provided, the processing section 300 can immediately calculate an appropriate composite size, scale transform the object 72 to be pasted and display the resulting composite image 50. With respect to FIG. 9, the perspective grid 35 is placed in correspondence with the natural image that is merely a bit map, so that when a graphics image mask is placed in the natural image and moved about it will automatically be changed in size as it moves and in correspondence with the perspective grid 35 based upon a length automatically assigned to the grid members and the length assigned to the scale of the graphics image. That is, the size will automatically change. The grid can be selectively displayed or not.

Although the foregoing description was made with respect to segmenting objects on the basis of their physical properties (e.g. transparency and/or surface normal) to generate the masks, the generating of transformation data of FIG. 2 also enables the segmentation to be made on the basis of other properties.

Figure 10:
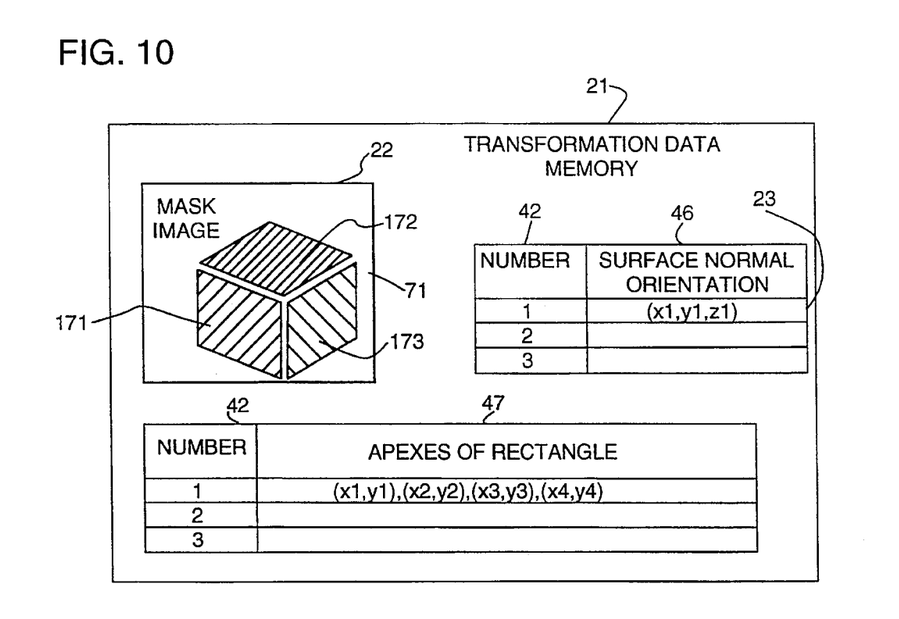
FIG. 10 shows mask images divided according to the attitude (surface normals) of an object and corresponding mask attribute tables, in image segmentation.

The mask image 22 of FIG. 10 consists of four regions with mask ID numbers 0, 1, 2 and 3 written to the regions 71, 171, 172 and 173, respectively. Moreover, in step 111 for creating the mask attribute tables, there is prepared a table describing surface orientation in correspondence to the mask ID numbers 42, and the orientations 46 of the surface normals are written therein. By creating the mask and describing the surface normal in this way it becomes possible to carry out texture mapping with respect to the object surfaces. More specifically, assuming that in its initial state the image to be pasted is facing to the front, since this means that the orientation of the surface normal is N0 (x, y, z)=(0, 0, 1), if the surface normal of the surface to be pasted is defined as N1 ($\alpha$, $\beta$, $\gamma$), it then becomes possible to create the image to be pasted to the object image by carrying out coordinate transformation using the transformation T for moving N0 to N1.

Figure 11:
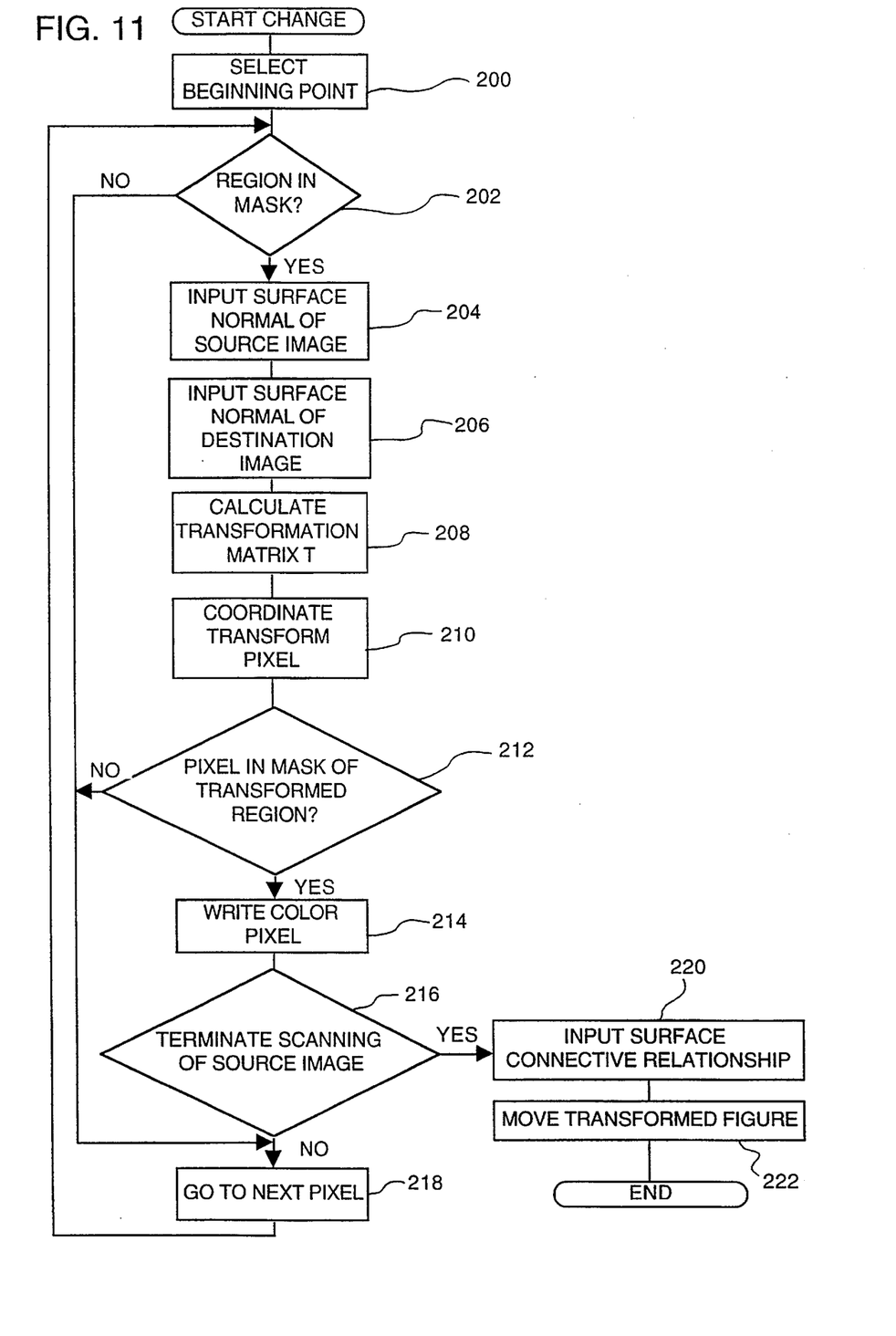
FIG. 11 is a flow chart for texture mapping of the image of an object surface in a CG image and for changing the orientation of the texture mapping according to orientation (surface normal) of the object.

As to FIGS. 10 and 11, in texture mapping a texture changes with changes in viewing angle or with rotational angle of the object, however one thinks of it. For example, a cross-hatch or checkered pattern placed on one surface of a cube, will change as the cube is rotated.

Since the transformation T can be achieved by means of the transformation Tx for rotation about the x axis and transformation Ty for rotation about the y axis, the general transformation T can be expressed as the determinant of Eq. 6.

$$(\alpha, \beta, \gamma, 1) = (x, y, z, 1) \cdot T \qquad \text{(Eq. 6)}$$

$$T = T_y \cdot T_x = \begin{pmatrix} \cos\Phi & \sin\Phi\sin\theta & -\sin\Phi\cos\theta & 0 \\ 0 & \cos\theta & \sin\theta & 0 \\ \sin\Phi & -\cos\Phi\sin\theta & \cos\Phi\cos\theta & 0 \\ 0 & 0 & 0 & 1 \end{pmatrix}$$

Solving Eq. 6 for $\alpha$, $\beta$, $\gamma$, gives Eq. 7.

$$\alpha = x \cos\Phi + z \sin\theta$$
$$\beta = x \sin\Phi\sin\theta + y \cos\theta - z \cos\Phi\cos\theta$$
$$\gamma = -x \sin\Phi\cos\theta + y \sin\theta + z \cos\Phi\cos\theta \qquad \text{(Eq. 7)}$$

In other words it suffices to calculate $\theta$ and $\Phi$ from Eq. 7, rotate by $\Phi$ about the y axis and rotate by $\theta$ about the x axis for texture mapping during simulation in the simulation section 300.

In addition, simulation for changing the viewing angle and simulation for changing the object orientation becomes possible if the direction of the eye as viewed from the object coordinate system is described in addition to the mask images segmented according to the surfaces and the surface normals.

In this case, assuming that the initial state of a surface normal is ($\alpha 0$, $\beta 0$, $\gamma 0$), it is possible to apply Eq. 7 as it is. Therefore, if the surface normal after the transformation is given, the orientation of the object can be changed to some degree by conducting geometric transformation with respect to the individual surfaces while maintaining the connective relationship among the surfaces. The procedure for changing object orientation in the simulation section 300 will be explained with reference to the flow chart of FIG. 11.

In step 200 pixel scanning is started from the beginning point of the source image. At each pixel, control passes to step 202 where a check is made as to the mask to which the pixel belongs. If the pixel belongs to one of the masks, the portion including the pixel is assigned a surface normal in step 204. If the pixel does not belong to any of the masks, control passes to step 218 in which the neighboring pixel is scanned.

On the other hand, when the orientation of an object has changed, the position to which the region of a given mask has moved and the direction in which the surface normal of the region is oriented are known. Therefore, at the time when the mask to which a pixel belongs is identified, step 202, the surface normal of the cut object destination in step 206 is known. Since ($\alpha$, $\beta$, $\gamma$) and (x, y, z) of Eq. 6 are known from steps 204 and 206, the transformation matrix T is calculated in step 208, and the pixel is coordinate transformed by the matrix T in step 210. Then, in step 212, a check is made as whether or not the transformed pixel fits in the transformed mask. If the transformed pixel is in the mask, the color value is written in step 214.

Only after the foregoing procedures have been conducted with respect to all pixels of the original CG image 20 does control pass from step 216 to step 220 rather than step 218. Based on the connective relationship among the surfaces input in step 220, step 222 moves the transformed regions by parallel translation to restore the original connective relationship.

For achieving the color change in the image simulation in simulation section 300, this invention creates the intrinsic image 28 from the CG model 10 by data transformation in transformation section 100. With reference to FIG. 12, an intrinsic image 28 consists of stored pixel color data stored in the intrinsic image attribute table 245 of FIG. 3 obtained by resolving visible colors into the object color component 150, light source color component 160 and ambient color component 170. The actual color component data 150, 160, 170 saved differs depending on the content to be changed. The CG model 10 consists of an object model 12, a light source model 14 and an eye position 16. The angle between the light source and the object surface normal 15 is defined as $\theta$ and the angle between the eye 16 and the object surface normal 15 is defined s $\Phi$. In this case: the object color component 150 is expressed as the product of the object color vector 152, a function of $\theta$ 154 and the light source color attenuation factor 156; the light source color component 160 is expressed as the product of the light source color vector 162, a function of ($\theta$, $\Phi$) 164 and the light source color attenuation factor 156; and the ambient color component 170, which is the component of the light reflected by the ambient atmosphere etc., is expressed as a constant value. Further, the object color vector 152 is expressed as the product of the dispersion reflectivity 158 peculiar to the paint on the object surface and the light source color 14, and the light source color vector 162 is expressed as the product of the specular reflectivity 168 and the light source color 14.

In the data transformation section 100, since the dispersion reflectivity 158 and other surface attributes are known once the object found by ray tracing is identified in step 108, the object color vector 152 is at this time separated from the value of 154×156 (because object color component 150 is known) and saved in the intrinsic image 28, whereby the color of the object can be changed during image simulation by changing the value of the object color vector 152. Similarly, the light source color vector 162 is saved in the intrinsic image 28 separately from the values of 164 and 166, whereby the light source color can be changed by changing the value of the light source color vector 162. Likewise, the dispersion reflectivity 158 is saved separately whereby the texture can be changed by changing the value of 158, and the specular reflectivity 168 is saved separately whereby the luster can be changed by changing the value of specular reflectivity 168.

While the foregoing explanation describes the data transformation for the case where a CG image 20 is used in the image simulation, the invention is not limited to this type of transformation but can also be applied to other types of data. An example relating to such other types of data will now be explained with reference to the flow chart of FIG. 13.

Figure 13:
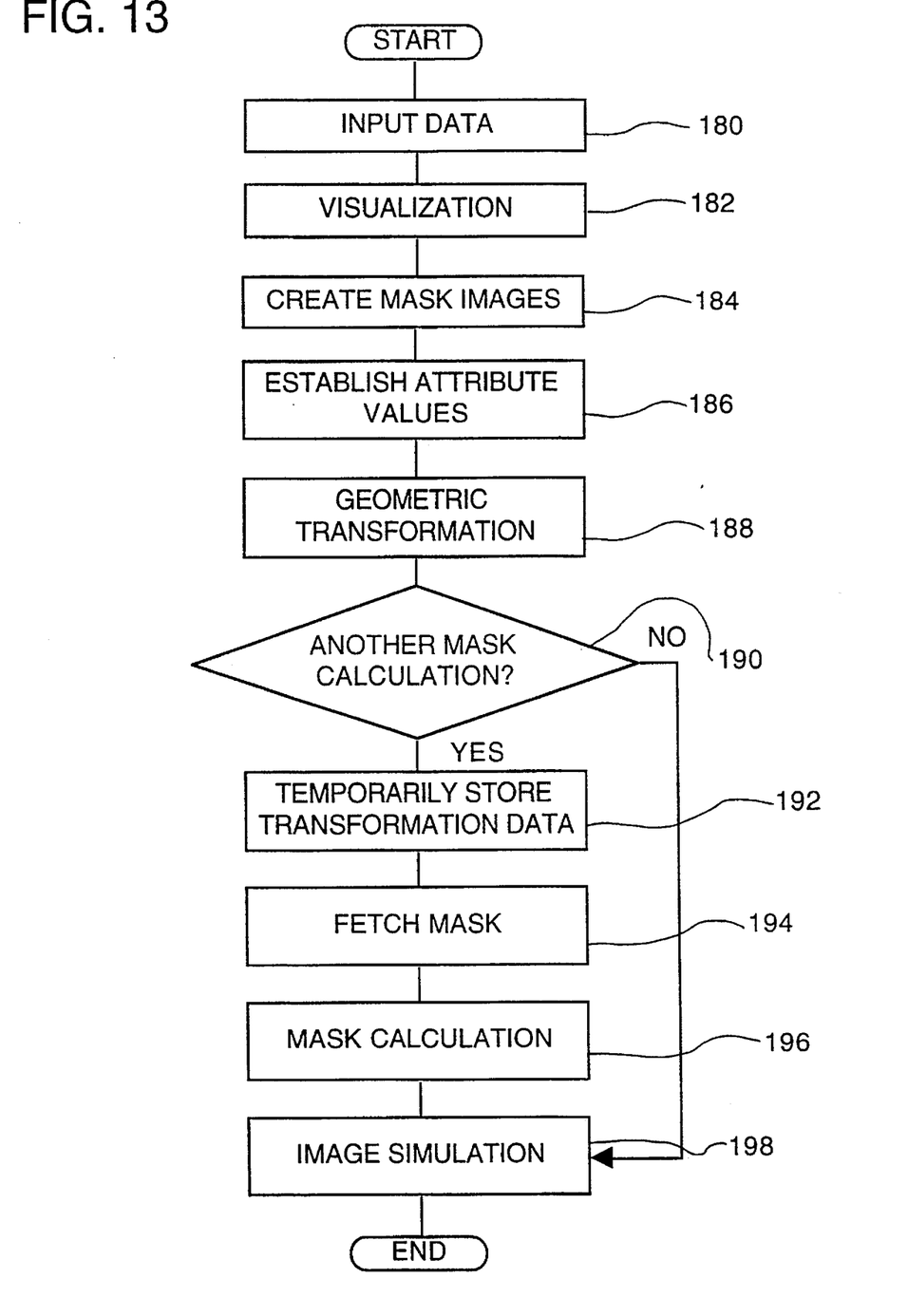
FIG. 13 is a data transformation flow chart using data other than from a CG image, in image simulation.

CG data, written character and pattern design outline data, data on a natural image 30 and the like are input in step 180. The input data are visualized (e.g. displayed on a screen) in step 182. At the same time, the data are segmented into regions according to the properties required in image simulation, whereby masks of mask images 22 are created for each region (184). Next, the mask attributes 45 are written to the attribute tables in accordance with the segmented properties (186). Then, in step 188, the color CG image 20 and the mask image 22 are subjected to geometric transformation. If it is found in the following step 190 that no further mask is required, the transformation data is immediately sent to the image simulation step 198.

If another mask has to be calculated, the transformation data in step 192 is temporarily stored, another mask used in the calculation is read in step 194, the temporarily stored transformation data and the mask image are processed in step 196, and the result is sent to the image simulation step 198.

The same processing can be used for assembling CG images, written characters and patterns with natural images. After a written character or pattern, as a mask, is pasted on the object surface, the color of the character portion can be changed easily by changing the color of the mask regions.

As explained in the foregoing, in accordance with the present invention images created with computer graphics are automatically and simultaneously transformed into transformation data that can be directly handled in image simulation and, therefore, a computer running an image simulation program can be immediately used for creating composite images with natural images.

In addition, written characters and pattern designs can be assembled with natural images by creating masks for the characters and designs, transforming the masks to transformation data that can be handled in image simulation and storing the results. Variations of the characters and designs can then be created by image simulation.

While a preferred embodiment has been set forth with specific details, further embodiments, modifications and variations are contemplated according to the broader aspects of the present invention, all as determined by the spirit and scope of the following claims.

We claim:

1. A composite image simulation method performed by a computer system, comprising the following steps performed by the computer system of:

gathering computer graphics (CG) image data during creation of a CG image with computer graphics based on a shape model;

projecting the shape model on a projection plane for creating a projected image, assigning different mask numbers to different shape model regions of the projected image and at least another region outside the shape model regions, and saving the regions as masks associated with the mask numbers as a mask image, wherein said projecting, assigning, and saving are data transforming conducted automatically in response to said gathering; and cutting only a desired image from the computer graphics image by using the mask image and the mask numbers to obtain a cut image, and as a part of image simulation combining the cut image and another image that is independent of the computer graphics image to obtain the composite image, wherein said cutting and combining are image simulation.

2. A composite image simulation method according to claim 1, wherein said data transforming further comprises the steps of classifying the shape model regions and the another region according to transmittance based on surface information of the computer graphics image, creating the mask image by writing different ones of the mask numbers into the regions, and forming tables in memory for describing the transmittance as attribute information of the mask image regions; and said combining including transparency processing on the basis of the attribute information.

3. A composite image simulation method according to claim 2, wherein said creating the mask image removes a transparent portion from a first mask; and said combining including assembling the first mask, not including the transparent portion, with the another image to obtain a temporary combined image, and then assembling the transparent portion with the temporary combined image to obtain the composite image having the another image inside an object of the first mask as seen through the transparent portion.

4. A composite image simulation method according to claim 1, wherein said data transforming includes saving a computer graphics image scale as a scalar quantity correlated to an actual length of a part of the shape model; and wherein said combining includes automatically changing the relative sizes of the cut image and the another image to match the computer graphics image scale to a scale of the another image.

5. A composite image simulation method according to claim 4, wherein said saving a computer graphics image scale includes saving a perspective grid of actual lengths for one of the mask image and the another image.

6. A composite image simulation method according to claim 5, wherein said combining includes changing the size of the cut image as the cut image is moved within the composite image, with such changing being on the basis of the perspective grid.

7. A composite image simulation method according to claim 1, wherein said data transforming further includes dividing a polyhedral in the computer graphics image into surfaces based on the shape model, creating the masks in accordance with the surfaces, and saving the masks and surface normals as attributes of the masks; and said combining including texture mapping the another image to the cut image by geometrical transformation of the another image using the surface normals.

8. A composite image simulation method according to claim 7, said texture mapping including reorienting the another image by geometrical transformation with respect to the surfaces on the basis of the surface normals.

9. A composite simulation method according to claim 1, wherein said data transforming includes the following steps conducted for each pixel of the computer graphics image for producing an intrinsic image:

calculating a light source color vector from color of a light source and specular reflectivity of an object of the computer graphics image;

calculating a light source color component from the light source color vector and angles among the light source, a surface of the object and an eye position;

calculating an object color vector from the light source color and a dispersion reflectivity;

calculating an object color component from the object color vector and from the angle between the light source and the surface of the object;

defining illumination by light other than light directly from the light source as an ambient color component;

creating the intrinsic image from the light source color component, the object color component and the ambient color component; and wherein said data transforming further includes saving the intrinsic image.

10. A composite image simulation method according to claim 9, wherein said calculating a light source color component uses a light source attenuation factor.

11. A composite image simulation method according to claim 9, wherein said calculating an object color component uses a light source attenuation factor.

12. A composite image simulation method according to claim 9, wherein said image simulation further includes thereafter changing the light source color vector to change the light source color component.

13. A composite image simulation method according to claim 9, wherein said data transforming further includes saving the dispersion reflectivity as a value separate from the color components; and said image simulation including changing texture of the object by changing the dispersion reflectivity and recalculating the object color component.

14. A composite image simulation method according to claim 9, wherein said data transforming further includes saving the specular reflectivity as a value separate from the color components; and thereafter said image simulation including changing luster of the object by changing the specular reflectivity and recalculating the light source color component.

15. A composite image simulation method according to claim 1, wherein said data gathering further includes inputting and imaging one data of written character data, pattern outline data and diagram vector data;

wherein said data transforming further includes creating the masks by dividing the CG image into the regions according to properties required for image simulation, saving the masks, creating data tables describing attributes of the masks, and saving the data tables; and wherein said combining combines the one data and one of the masks with reference to the data tables to obtain the composite image.

16. An image simulation method performed by a computer, said method including the following data transforming steps conducted simultaneously with a creating of a computer graphics image with computer graphics and based on a shape model in the computer, for producing an intrinsic image and being performed for each pixel of the computer graphics image:

calculating a light source color vector from color of a light source and specular reflectivity of an object of the computer graphics image;

calculating a light source color component from the light source color vector and angles among the light source, a surface of the object and an eye position;

calculating an object color vector from the light source color and a dispersion reflectivity of the object;

calculating an object color component from the object color vector and from the angle between the light source and the surface of the object;

defining illumination by light other than light directly from the light source as an ambient color component; and separately saving each of the light source color component, the object color component and the ambient color component as the intrinsic image.

17. The method of claim 16, further including image simulating conducted after said data transforming and including subsequently changing color of the object by changing the object color vector.

18. The method of claim 16, wherein said calculating the light source color component uses a light source attenuation factor.

19. The method of claim 16, wherein said calculating the object color component uses a light source attenuation factor.

20. The method of claim 16, said data transforming further including image simulating conducted after said data transforming and including thereafter changing the light source color vector to change the light source color.

21. The method of claim 20, said data transforming further including saving the dispersion reflectivity as a value separate from the color components; and said image simulating including changing texture of the object by changing the dispersion reflectivity and recalculating the object color component.

22. The method of claim 20, said data transforming further including saving the specular reflectivity as a value separate of the color components; and thereafter said image simulating including changing luster of the object by changing the specular reflectivity and recalculating the light source color component.

23. An image simulation method comprising the steps of:

inputting and imaging one data of written character data, pattern outline data and diagram vector data;

creating masks by dividing an image into regions according to properties required for image simulation;

saving the masks;

creating data tables describing attributes of the masks;

saving the data tables; and combining the one data and one of the masks with reference to the data tables to obtain a composite image.

24. A composite image simulation method performed by a computer system, comprising the following steps performed by the computer system of:

gathering computer graphics (CG) image data during creation of a CG image with computer graphics based on a three-dimensional shape model;

projecting the three-dimensional shape model on a projection plane for creating a projected image, assigning different mask numbers to different three-dimensional shape model regions of the projected image and at least another region outside the three-dimensional shape model regions, and saving the regions as masks associated with the mask numbers as a mask image, wherein said projecting, assigning, and saving are data transforming conducted automatically in response to said gathering; and cutting only a desired image from the computer graphics image by using the mask image and the mask numbers to obtain a cut image, and as a part of image simulation combining the cut image and another image that is independent of the computer graphics image to obtain the composite image, wherein said cutting and combining are image simulation.

25. A composite image simulation method according to claim 24, wherein said data transforming further comprises the steps of classifying the three-dimensional shape model regions and the another region according to transmittance based on surface information of the computer graphics image, creating the mask image by writing different ones of the mask numbers into the regions, and forming tables in memory for describing the transmittance as attribute information of the mask image regions; and said combining including transparency processing on the basis of the attribute information.

26. A composite image simulation method according to claim 25, wherein said creating the mask image removes a transparent portion from a first mask; and said combining including assembling the first mask, not including the transparent portion, with the another image to obtain a temporary combined image, and then assembling the transparent portion with the temporary combined image to obtain the composite image having the another image inside an object of the first mask as seen through the transparent portion.

27. A composite image simulation method according to claim 24, wherein said data transforming includes saving a computer graphics image scale as a scalar quantity correlated to an actual length of a part of the three-dimensional shape model; and wherein said combining includes automatically changing the relative sizes of the cut image and the another image to match the computer graphics image scale to a scale of the another image.

* * * * *